US012643414B2

(12) United States Patent
Komatsubara et al.

(10) Patent No.: US 12,643,414 B2
(45) Date of Patent: Jun. 2, 2026

(54) ELECTRIC VEHICLE CONTROL SYSTEM

(71) Applicant: HONDA MOTOR CO., LTD., Tokyo (JP)

(72) Inventors: Masaru Komatsubara, Tokyo (JP); Masahide Ueda, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 18/629,984

(22) Filed: Apr. 9, 2024

(65) Prior Publication Data

US 2024/0343123 A1 Oct. 17, 2024

(30) Foreign Application Priority Data

Apr. 14, 2023 (JP) ................................ 2023-066387

(51) Int. Cl.
B60L 15/20 (2006.01)

(52) U.S. Cl.
CPC ......... B60L 15/20 (2013.01); *B60L 2240/421* (2013.01); *B60L 2240/423* (2013.01); *B60L 2240/486* (2013.01)

(58) Field of Classification Search
CPC ............... B60L 15/20; B60L 2240/421; B60L 2240/423; B60L 2240/486; B60L 2260/28; B60L 9/18; B60L 2220/42; B60L 15/32; Y02T 10/72
See application file for complete search history.

(56) References Cited

U.S. PATENT DOCUMENTS

2004/0044458 A1 3/2004 Kadota
2010/0222953 A1* 9/2010 Tang ...................... B60L 15/20
701/22

FOREIGN PATENT DOCUMENTS

JP 2004-100718 4/2004
JP 2009-113570 5/2009
JP 2013-169818 9/2013
JP 2016-190607 11/2016
JP 2019-140797 8/2019

OTHER PUBLICATIONS

Japanese Office Action for Japanese Patent Application No. 2023-066387 mailed Apr. 16, 2024.

* cited by examiner

*Primary Examiner* — Alan D Hutchinson
(74) *Attorney, Agent, or Firm* — Amin, Turocy & Watson, LLP

(57) ABSTRACT

An electric vehicle control system includes a traction control portion, a wheel torque control portion, a front motor control portion, and a rear motor control portion. The traction control portion controls the traction of each of a plurality of wheels. The wheel torque control portion controls the torque of each of the plurality of wheels by setting a request torque for each of a plurality of rotary electric machines that transmit and receive the torque to and from the plurality of wheels. The front motor control portion and the rear motor control portion control operations of a front motor and a rear motor. The wheel torque control portion relatively prioritizes an operation of the wheel torque control portion over an operation of the traction control portion in accordance with an idling state of at least one of the plurality of wheels.

7 Claims, 6 Drawing Sheets

ELECTRIC VEHICLE CONTROL SYSTEM

CROSS-REFERENCE TO RELATED APPLICATION

Priority is claimed on Japanese Patent Application No. 2023-066387, filed on Apr. 14, 2023, the contents of which are incorporated herein by reference.

BACKGROUND

Field of the Invention

The present invention relates to an electric vehicle control system.

Background

In recent years, efforts to provide access to sustainable transport systems have increased in consideration of vulnerable people among traffic participants such as the elderly, disabled, or children. In order to realize this, research and development has focused on improving the safety and convenience of transport through the development of vehicle behavior stability.

In the related art, electric vehicles are known that distribute a request torque to a front wheel request torque and a rear wheel request torque and correct the front wheel request torque and the rear wheel request torque by transferring torque in accordance with a slip amount from one of the front wheel and the rear wheel, which is slipping, to the other of the front wheel and the rear wheel (for example, refer to Japanese Unexamined Patent Application, First Publication No. 2013-169818).

SUMMARY

In vehicle behavior stability, when a slip of a wheel occurs at the time of acceleration or at the time of deceleration, a problem is to resolve a slip state while preventing a decrease of acceleration or deceleration and preventing the vehicle behavior from becoming unstable.

For example, since the electric vehicle of the related art described above corrects the front wheel request torque and the rear wheel request torque with reference to a map prepared in advance and indicating a correspondence relationship between the slip amount and a torque transfer amount, there is a possibility that, depending on a road surface state, the slip cannot be resolved, or the vehicle behavior becomes unstable. For example, since a grip limit of a tire changes in response to a load and a road surface friction coefficient, the grip limit of a tire changes since different road surfaces have different friction coefficients depending on their state, such as a wet state, a snow state, and an ice state. Thereby, for example, when the torque transfer amount is set from a map prepared by assuming a specific road surface state, the torque transfer amount becomes unsuitable due to the difference from an actual road surface state, and there is a possibility that the slip is not resolved, and the vehicle behavior becomes unstable.

An object of the present application is to appropriately resolve a slip state while preventing a decrease of acceleration or deceleration and preventing a vehicle behavior from becoming unstable. The present application contributes to the development of sustainable transport systems.

An electric vehicle control system according to a first aspect of the present invention includes: a first control portion that controls the traction of each of a plurality of wheels; a second control portion that controls the torque of each of the plurality of wheels by setting a request torque for each of a plurality of rotary electric machines that transmit and receive the torque to and from the plurality of wheels; a plurality of rotary electric machine control portions that control an operation of each of the plurality of rotary electric machines in response to a command input from each of the first control portion and the second control portion; and a cooperation control portion that relatively prioritizes an operation of the second control portion over an operation of the first control portion in accordance with an idling state of at least one of the plurality of wheels.

A second aspect is the electric vehicle control system according to the first aspect described above, wherein each of the plurality of rotary electric machine control portions may be provided individually so as to correspond to each of the plurality of rotary electric machines.

A third aspect is the electric vehicle control system according to the first or second aspect described above, wherein the cooperation control portion may relatively prioritize the operation of the second control portion over the operation of the first control portion by changing a second determination threshold value that determines whether or not it is necessary to operate the second control portion with respect to the idling state in accordance with a first determination threshold value that determines whether or not it is necessary to operate the first control portion with respect to the idling state.

A fourth aspect is the electric vehicle control system according to the third aspect described above, wherein the first control portion may control the traction of each of the plurality of wheels by setting a target rotation speed for each of the plurality of rotary electric machines, and the second control portion may set the torque distributed to the plurality of wheels in accordance with the torque requested from a driver.

A fifth aspect is the electric vehicle control system according to the fourth aspect described above, wherein the cooperation control portion may be the second control portion.

According to the first aspect described above, by including the cooperation control portion that prioritizes the operation of the second control portion over the operation of the first control portion, for example, it is possible to prevent the operation of the first control portion that may decrease the torque in order to ensure a desired traction. By prioritizing the second control portion that can control the torque of each wheel without decreasing the overall torque of the vehicle, it is possible to appropriately resolve a slip state while preventing a decrease of acceleration or deceleration and preventing the vehicle behavior from becoming unstable.

In the case of the second aspect described above, the rotary electric machine control portion is provided individually on each rotary electric machine, and thereby, it is possible to shorten the time required for the control of each rotary electric machine.

In the case of the third aspect described above, by changing the second determination threshold value in accordance with the first determination threshold value, it is possible to prioritize the operation of the second control portion without changing the operation of the first control portion.

In the case of the fourth aspect described above, by changing the torque distribution of each wheel without decreasing the overall torque of the vehicle, the second control portion can resolve a slip state.

In the case of the fifth aspect described above, only by changing the operation of the second control portion, it is possible to prioritize the second control portion over the first control portion.

DESCRIPTION OF EMBODIMENTS

Hereinafter, an electric vehicle control system according to an embodiment of the present invention will be described with reference to the drawings.

Figure 1:
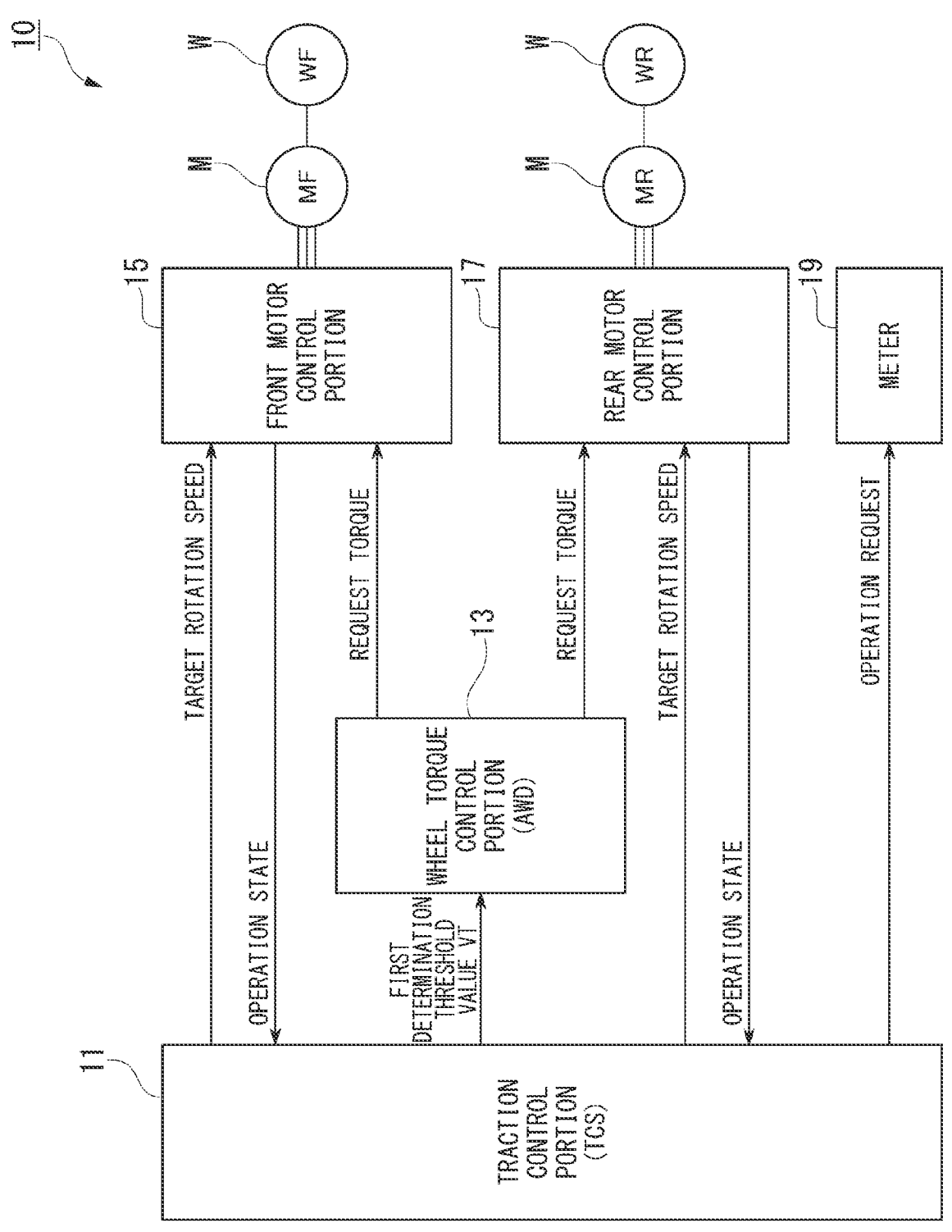
FIG. 1 is a block diagram showing a functional configuration of an electric vehicle control system in an embodiment of the present invention.

FIG. 1 is a block diagram showing a functional configuration of an electric vehicle control system 10 in an embodiment. The electric vehicle control system 10 of the embodiment is mounted, for example, on an electric vehicle (vehicle) such as an electric automobile, a hybrid vehicle, and a fuel cell vehicle. The electric automobile is driven using a battery as a power source. The hybrid vehicle is driven using a battery and an internal combustion engine as a power source.

The fuel cell vehicle is driven using a fuel cell as a power source.

The electric vehicle control system 10 in the embodiment controls an electric vehicle, for example, on which a plurality of rotary electric machines M that transmit and receive torque to and from a plurality of wheels W and a notification device that presents various kinds of information to a driver are mounted. The rotary electric machine M is, for example, a three-phase AC brushless DC motor or the like. A rotary electric machine 14 generates a drive torque and provides torque to the wheel W by performing a power running operation using electric power supplied from an electric power conversion device or the like. The rotary electric machine M generates electric power and provides a braking torque to the wheel W by performing a regeneration operation using a rotation power input from the wheel W side. The rotary electric machine M is, for example, a front motor MF connected to right and left front wheels WF (wheel) and a rear motor MR connected to right and left rear wheels WR (wheel).

As shown in FIG. 1, the electric vehicle control system 10 includes, for example, a traction control portion 11 (a first control portion), a wheel torque control portion 13 (a second control portion, a cooperation control portion), a front motor control portion 15 (a rotary electric machine control portion), a rear motor control portion 17 (a rotary electric machine control portion), and a meter 19.

Each of the control portions 11, 13, 15, and 17 is, for example, a software function unit that functions by a predetermined program being executed by a processor such as a CPU (Central Processing Unit). The software function unit is an ECU that includes a processor such as a CPU, a ROM (Read-Only Memory) that stores the program, a RAM (Random-Access Memory) that temporarily stores data, and an electronic circuit such as a timer. At least some of the control portions 11, 13, 15, and 17 may be an integrated circuit such as a LSI (Large-Scale Integration).

Each of the control portions 11, 13, 15, and 17 acquires a signal of a detection value output from various sensors. The various sensors include, for example, a sensor that detects an accelerator operation amount of the driver, a current sensor that detects a current of each phase of the rotary electric machine M, a voltage sensor that detects a voltage of each phase of the rotary electric machine M, a rotation angle sensor that detects a rotation angle of the rotary electric machine M, a speed sensor that detects a speed (vehicle body speed) of the vehicle, a wheel speed sensor that detects a rotation speed (wheel speed) of each wheel W of the vehicle, and the like.

The traction control portion 11 constitutes part of a device that prevents an abrupt change in vehicle behavior and stabilizes an attitude, such as a so-called TCS (Traction Control System). The traction control portion 11 prevents idling of a drive wheel, for example, on a slippery road surface or the like and ensures a desired drive force and a steering capability.

For example, the traction control portion 11 controls the traction of each of the plurality of wheels W by setting a target rotation speed for each of the plurality of rotary electric machines M. The traction control portion 11 sets a target rotation speed for each of the front motor MF that transmits and receives torque to and from the right and left front wheels WF of the vehicle and the rear motor MR that transmits and receives torque to and from the right and left rear wheels WR of the vehicle. The traction control portion 11 transmits information of the target rotation speed by communicating with each of the front motor control portion 15 and the rear motor control portion 17 described later and receives information of an operation state of traction control. The traction control portion 11 estimates a state of the vehicle on the basis of various kinds of information received from the outside such as the information of the operation state of the traction control. The traction control portion 11 commands the meter 19 described later to perform notification indicating that the traction control is in operation or is stopping.

For example, the traction control portion 11 determines whether or not it is necessary to perform the traction control in response to an idling state of at least one of the plurality of wheels W of the vehicle. The traction control portion 11 determines whether or not it is necessary to perform the traction control in response to a comparison result between a rotation speed (wheel speed Vw) of a main drive wheel responsible for a relatively large torque among the plurality of wheels W and a predetermined determination threshold value (first determination threshold value VT) set with respect to the wheel speed Vw. For example, at the time of a power running operation of the plurality of rotary electric machines M such as when the vehicle is accelerated, or at the time of a regeneration operation of the plurality of rotary electric machines M such as when the vehicle is decelerated, the traction control portion 11 determines whether or not the wheel speed Vw of the right and left front wheels WF, which are main drive wheels, exceeds the predetermined first determination threshold value VT. The traction control portion 11 determines whether or not the wheel speed Vw is larger than a first high-side determination threshold value VTH at the time of the power running operation of the rotary electric machine M, or whether or not the wheel speed Vw is smaller than a first low-side determination threshold value VTL at the time of the regeneration operation of the rotary electric machine M.

For example, the traction control portion 11 performs the traction control when the wheel speed Vw of the front wheel WF in an idling state exceeds the predetermined first determination threshold value VT and stops performing the traction control when the wheel speed Vw of the front wheel WF does not exceed the predetermined first determination threshold value VT. The traction control portion 11 performs the traction control by setting a target rotation speed of each rotary electric machine M so as to decrease an overall drive force or a braking force of the plurality of wheels W.

For example, the traction control portion 11 transmits information of the first determination threshold value VT (for example, the first high-side determination threshold value VTH and the first low-side determination threshold value VTL) to the wheel torque control portion 13 in response to a request from the wheel torque control portion 13 described later or the like prior to determining whether or not it is necessary to perform the traction control.

The wheel torque control portion 13 controls torque transmission at each wheel W of the vehicle such as in an AWD vehicle. The wheel torque control portion 13 optimizes the torque distribution of front, rear, right, and left wheels W, for example, in various travel states such as acceleration, deceleration, and rotation of the vehicle and ensures desired travel stability.

For example, the wheel torque control portion 13 controls the torque distributed to each of the plurality of wheels W by setting a request torque for each of the plurality of rotary electric machines M in accordance with the torque requested from the driver by an accelerator operation of the driver of the vehicle or the like. The wheel torque control portion 13 sets the request torque for each of the front motor MF and the rear motor MR. The wheel torque control portion 13 transmits information of the request torque by communicating with each of the front motor control portion 15 and the rear motor control portion 17 described later.

For example, the wheel torque control portion 13 determines whether or not it is necessary to perform torque distribution control in response to an idling state of at least one of the plurality of wheels W of the vehicle. The wheel torque control portion 13 determines whether or not it is necessary to perform torque distribution control in response to a comparison result between a rotation speed (wheel speed Vw) of the main drive wheel and a predetermined determination threshold value (second determination threshold value VA) set with respect to the wheel speed Vw. For example, at the time of a power running operation of the plurality of rotary electric machines M such as when the vehicle is accelerated, or at the time of a regeneration operation of the plurality of rotary electric machines M such as when the vehicle is decelerated, the wheel torque control portion 13 determines whether or not the wheel speed Vw of the right and left front wheels WF, which are main drive wheels, exceeds the predetermined second determination threshold value VA. The wheel torque control portion 13 determines whether or not the wheel speed Vw is larger than a second high-side determination threshold value VAH at the time of the power running operation of the rotary electric machine M, or whether or not the wheel speed Vw is smaller than a second low-side determination threshold value VAL at the time of the regeneration operation of the rotary electric machine M.

For example, the wheel torque control portion 13 performs torque distribution control when the wheel speed Vw of the front wheel WF in an idling state exceeds the predetermined second determination threshold value VA and stops performing torque distribution control when the wheel speed Vw of the front wheel WF does not exceed the predetermined second determination threshold value VA. The wheel torque control portion 13 performs torque distribution control by setting a request torque of each rotary electric machine M so as to decrease the torque distributed to the front wheel WF, which is a main drive wheel, responsible for a relatively large torque and to increase the torque distributed to the rear wheel WR, which is a sub-drive wheel responsible for a relatively small torque.

For example, the wheel torque control portion 13 acquires information of the first determination threshold value VT (for example, the first high-side determination threshold value VTH and the first low-side determination threshold value VTL) of the traction control portion 11 in response to a request with respect to the traction control portion 11 or the like prior to determining whether or not it is necessary to perform torque distribution control. The wheel torque control portion 13 determines whether or not a start timing of performing the traction control by the traction control portion 11 is earlier than a start timing of performing torque distribution control by the wheel torque control portion 13, for example, in response to a comparison result of magnitude comparison between the first determination threshold value VT and the second determination threshold value VA or the like. The wheel torque control portion 13 determines whether or not the first determination threshold value VT (first high-side determination threshold value VTH) is smaller than the second determination threshold value VA (second high-side determination threshold value VAH) at the time of the power running operation of the rotary electric machine M. The wheel torque control portion 13 determines whether or not the first determination threshold value VT (first low-side determination threshold value VTL) is larger than the second determination threshold value VA (second low-side determination threshold value VAL) at the time of the regeneration operation of the rotary electric machine M.

For example, when the wheel torque control portion 13 determines that the start timing of performing the traction control is earlier than the start timing of performing the torque distribution control, the wheel torque control portion 13 causes the start timing of performing torque distribution control to be earlier than the start timing of performing the traction control by changing the second determination threshold value VA in accordance with the first determination threshold value VT. The wheel torque control portion 13 sets a value (=k×VTH) obtained by multiplying the first determination threshold value VT (first high-side determination threshold value VTH) by a predetermined constant k (0<k<1) as a new second determination threshold value VA (second high-side determination threshold value VAH) at the power running operation of the rotary electric machine M. The wheel torque control portion 13 sets a value ($=j\times$VTL) obtained by multiplying the first determination threshold value VT (first low-side determination threshold value VTL) by a predetermined constant j (1<j) as a new second determination threshold value VA (second low-side determination threshold value VAL) at the time of the regeneration operation of the rotary electric machine M.

When the wheel torque control portion 13 does not determine that the start timing of performing the traction control is earlier than the start timing of performing the torque distribution control, the wheel torque control portion 13 maintains the second determination threshold value VA without changing the second determination threshold value VA.

Each of the front motor control portion 15 and the rear motor control portion 17 includes, for example, an electric power conversion device connected to an electric power source such as an electric power storage device mounted on a vehicle. The motor control portions 15 and 17 control electric power transmission and reception of each of the front motor MF and the rear motor MR, for example, via the electric power conversion device constituted of a plurality of switching elements or the like. The motor control portions 15 and 17 generate a rotation drive force by sequentially commutating electric power supply to a three-phase stator winding of the rotary electric machine M at the time of the power running operation of the rotary electric machine M (the motors MF and MR). At the time of the regeneration operation of the rotary electric machine M (the motors MF and MR), the motor control portions 15 and 17 convert a three-phase AC electric power input from the three-phase stator winding into DC electric power by a switching operation of each phase synchronized with the rotation of the rotary electric machine M.

The motor control portions 15 and 17 perform a feedback control for the rotation speed and the torque on the basis of the target rotation speed (command) input from the traction control portion 11, the request torque (command) input from the wheel torque control portion 13, and detection values input from the various sensors.

The meter 19 is part of the notification device mounted on the vehicle. The meter 19 performs notification of various types of information in response to a command signal input from the control portions 11, 13, 15, and 17 or the like. For example, the meter 19 performs notification indicating that the traction control by the traction control portion 11 is in operation or is stopping by an operation such as blinking of a lamp body. Hereinafter, an operation example of the electric vehicle control system 10 in the embodiment is described.

Figure 2:
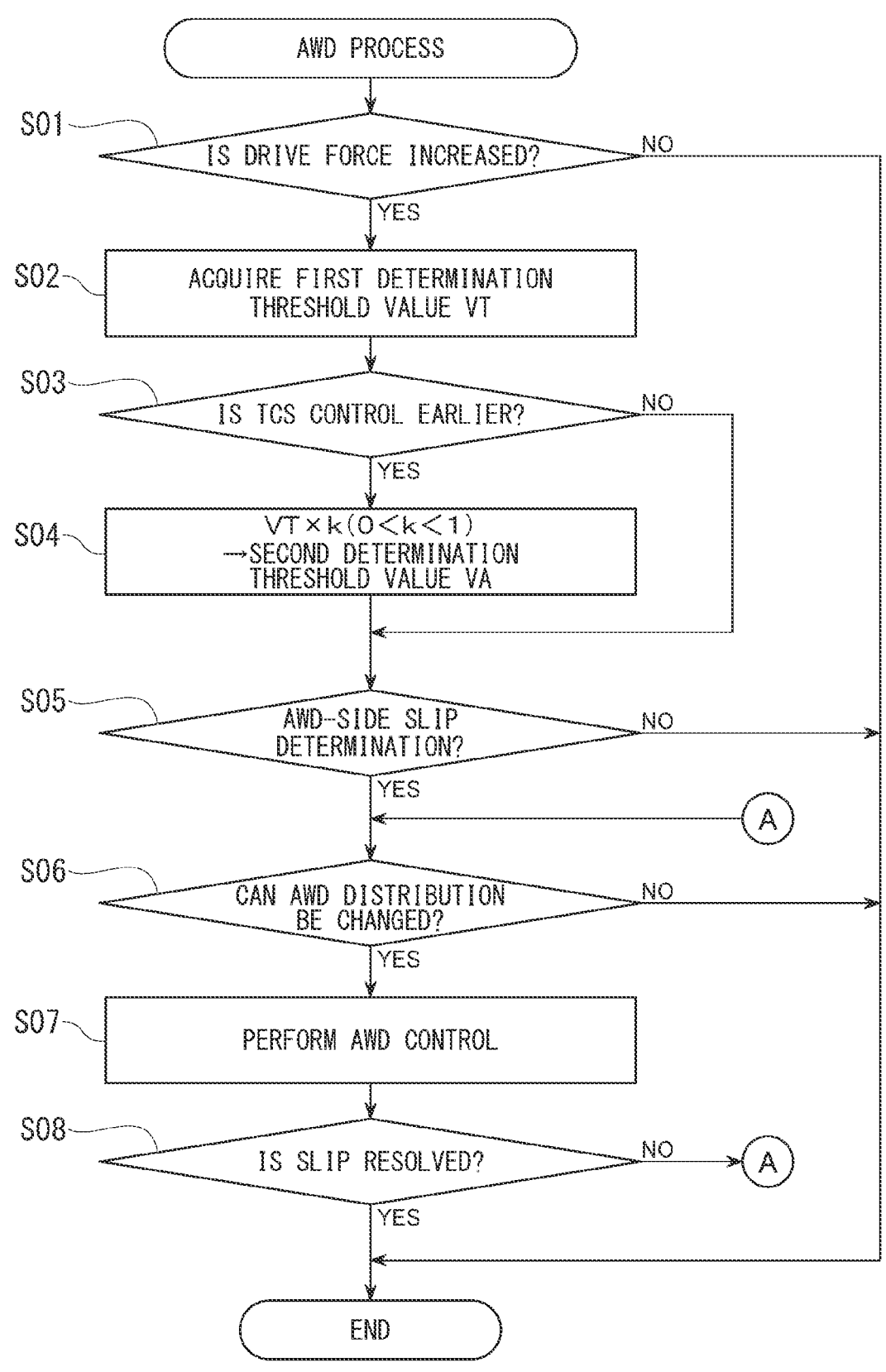
FIG. 2 is a flowchart showing an operation of a wheel torque control portion at the time of vehicle acceleration in the electric vehicle control system of the embodiment of the present invention.

FIG. 2 is a flowchart showing an operation of the wheel torque control portion 13 at the time of vehicle acceleration in the electric vehicle control system 10 of the embodiment.

As shown in FIG. 2, for example, at the time of vehicle acceleration, the wheel torque control portion 13 first determines whether or not the drive force of the vehicle is increased on the basis of an accelerator operation amount of the driver or the like (Step S01).

When the determination result is "NO", the wheel torque control portion 13 advances the process to the end.

On the other hand, when the determination result is "YES", the wheel torque control portion 13 advances the process to Step S02.

Next, the wheel torque control portion 13 acquires the first determination threshold value VT from the traction control portion 11 (Step S02).

Next, the wheel torque control portion 13 determines whether or not the start timing of performing the traction control (TCS control) by the traction control portion 11 is earlier than the start timing of performing the torque distribution control (AWD control) by the wheel torque control portion 13 by magnitude comparison between the first determination threshold value VT and the second determination threshold value VA or the like (Step S03).

When the determination result is "NO", the wheel torque control portion 13 advances the process to Step S05.

On the other hand, when the determination result is "YES", the wheel torque control portion 13 advances the process to Step S04.

Next, the wheel torque control portion 13 sets a value ($=k\times$VTH) obtained by multiplying the first determination threshold value VT by the predetermined constant k (0<k<1) as a new second determination threshold value VA (Step S04).

Next, the wheel torque control portion 13 performs an AWD-side slip determination of determining whether or not it is necessary to perform the torque distribution control (AWD control) (Step S05). For example, the wheel torque control portion 13 determines whether or not the front wheel WF, which is a main drive wheel, is in an idling state and whether or not the wheel speed Vw of the front wheel WF, which is the main drive wheel, is larger than the second determination threshold value VA.

When the determination result is "NO", the wheel torque control portion 13 advances the process to the end.

On the other hand, when the determination result is "YES", the wheel torque control portion 13 advances the process to Step S06.

Next, the wheel torque control portion 13 determines whether or not it is possible to change the torque distribution (AWD distribution) in the plurality of wheels W (Step S06). For example, the wheel torque control portion 13 determines whether or not it is possible to decrease the torque distributed to the front wheel WF, which is the main drive wheel, and to increase the torque distributed to the rear wheel WR, which is the sub-drive wheel, within a range of the output limit of each rotary electric machine M.

When the determination result is "NO", the wheel torque control portion 13 advances the process to the end.

On the other hand, when the determination result is "YES", the wheel torque control portion 13 advances the process to Step S07.

Next, the wheel torque control portion 13 performs the torque distribution control (AWD control) (Step S07). For example, the wheel torque control portion 13 decreases the torque distributed to the front wheel WF, which is the main drive wheel, and increases the torque distributed to the rear wheel WR, which is the sub-drive wheel, while maintaining the overall drive force of the vehicle.

Next, the wheel torque control portion 13 performs a slip resolution determination of determining whether or not it is necessary to stop performing the torque distribution control (AWD control) (Step S08). For example, the wheel torque control portion 13 determines whether or not the wheel speed Vw of the front wheel WF, which is the main drive wheel, is equal to or smaller than the second determination threshold value VA and whether or not the idling state of the front wheel WF, which is the main drive wheel, is resolved.

When the determination result is "NO", the wheel torque control portion 13 causes the process to return to Step S06 described above.

On the other hand, when the determination result is "YES", the wheel torque control portion 13 advances the process to the end.

Figure 3:
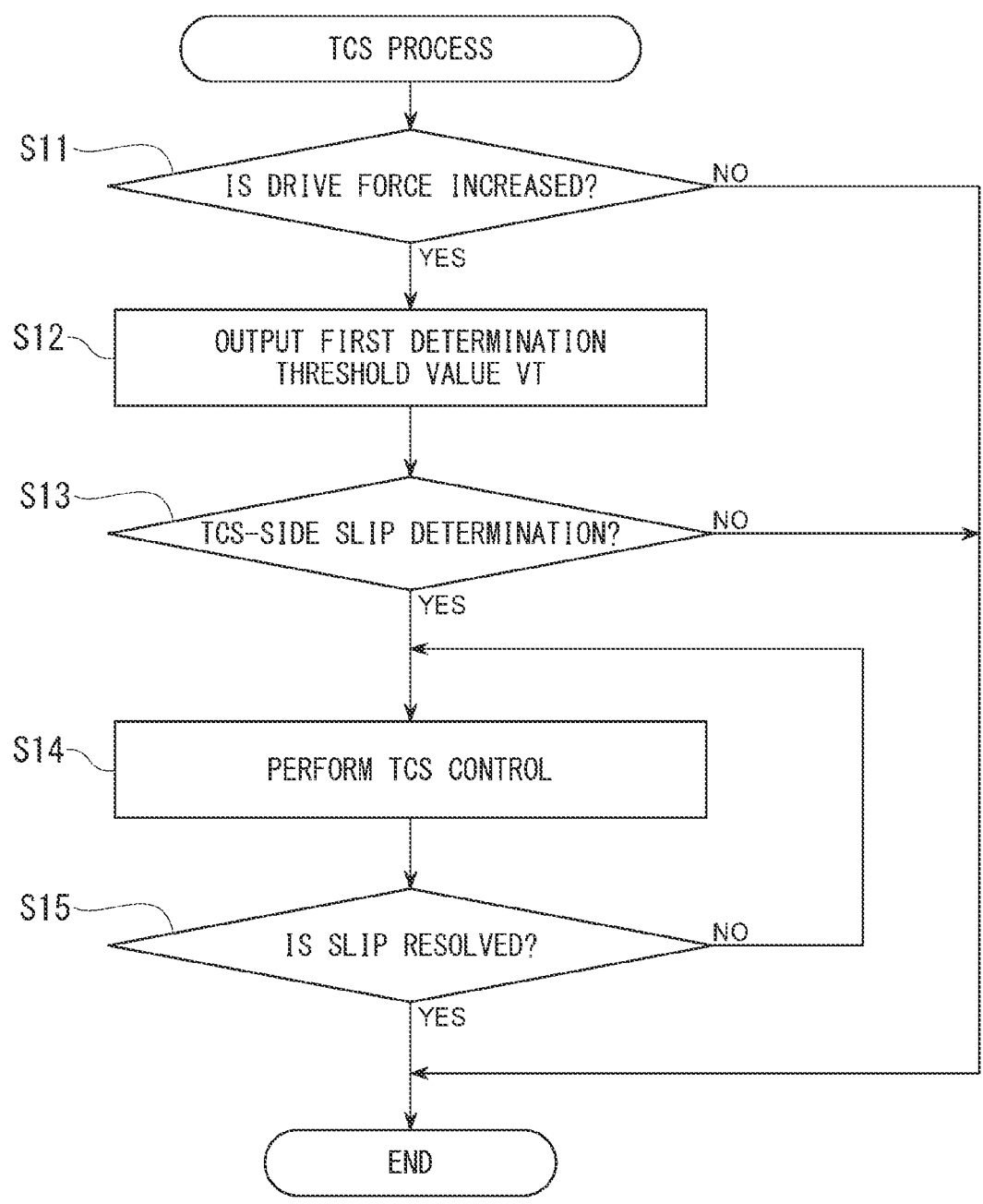
FIG. 3 is a flowchart showing an operation of a traction control portion at the time of vehicle acceleration in the electric vehicle control system of the embodiment of the present invention.

FIG. 3 is a flowchart showing an operation of the traction control portion 11 at the time of vehicle acceleration in the electric vehicle control system 10 of the embodiment.

As shown in FIG. 3, for example, at the time of vehicle acceleration, the traction control portion 11 first determines whether or not the drive force of the vehicle is increased on the basis of an accelerator operation amount of the driver or the like (Step S11).

When the determination result is "NO", the traction control portion 11 advances the process to the end.

On the other hand, when the determination result is "YES", the traction control portion 11 advances the process to Step S12.

Next, the traction control portion 11 outputs information of the first determination threshold value VT to the wheel torque control portion 13 (Step S12).

Next, the traction control portion 11 performs a TCS-side slip determination of determining whether or not it is necessary to perform the traction control (TCS control) (Step S13). For example, the traction control portion 11 determines whether or not the front wheel WF, which is a main drive wheel, is in an idling state and whether or not the wheel speed Vw of the front wheel WF, which is the main drive wheel, is larger than the first determination threshold value VT.

When the determination result is "NO", the traction control portion 11 advances the process to the end.

On the other hand, when the determination result is "YES", the traction control portion 11 advances the process to Step S14.

Next, the traction control portion 11 performs the traction control (TCS control) (Step S14). For example, the traction control portion 11 decreases the overall drive force of the plurality of wheels W.

Next, the traction control portion 11 performs a slip resolution determination of determining whether or not it is necessary to stop performing the traction control (TCS control) (Step S15). For example, the traction control portion 11 determines whether or not the wheel speed Vw of the front wheel WF, which is the main drive wheel, is equal to or smaller than the first determination threshold value VT and whether or not the idling state of the front wheel WF, which is the main drive wheel, is resolved.

When the determination result is "NO", the traction control portion 11 causes the process to return to Step S14 described above.

On the other hand, when the determination result is "YES", the traction control portion 11 advances the process to the end.

Figure 4:
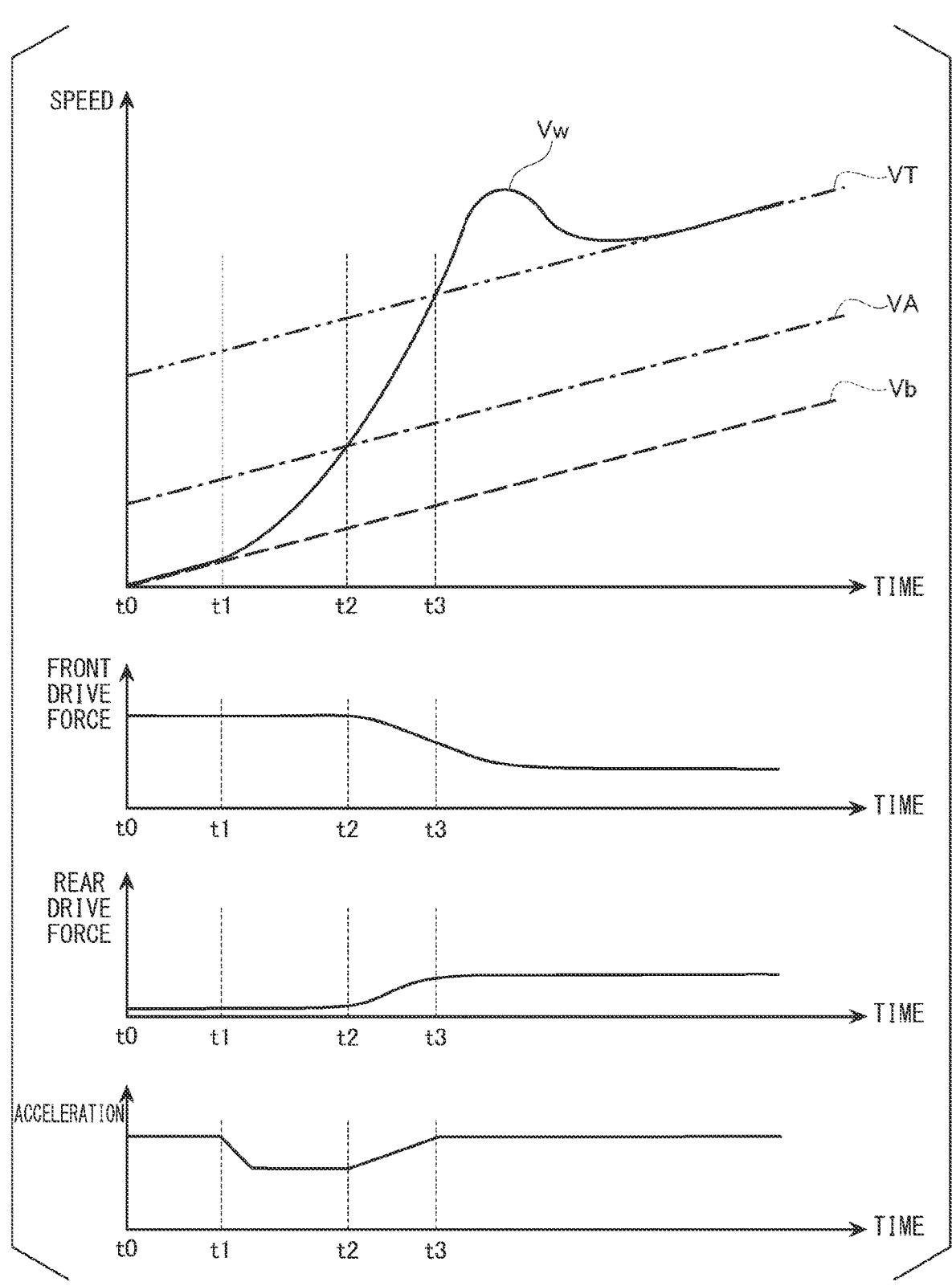
FIG. 4 is a graph showing an example of a correspondence relationship of a temporal change among a vehicle body speed, a wheel speed, a first determination threshold value, a second determination threshold value, a front drive force, a rear drive force, and acceleration at the time of vehicle acceleration in the electric vehicle control system of the embodiment of the present invention.
Figure 5:
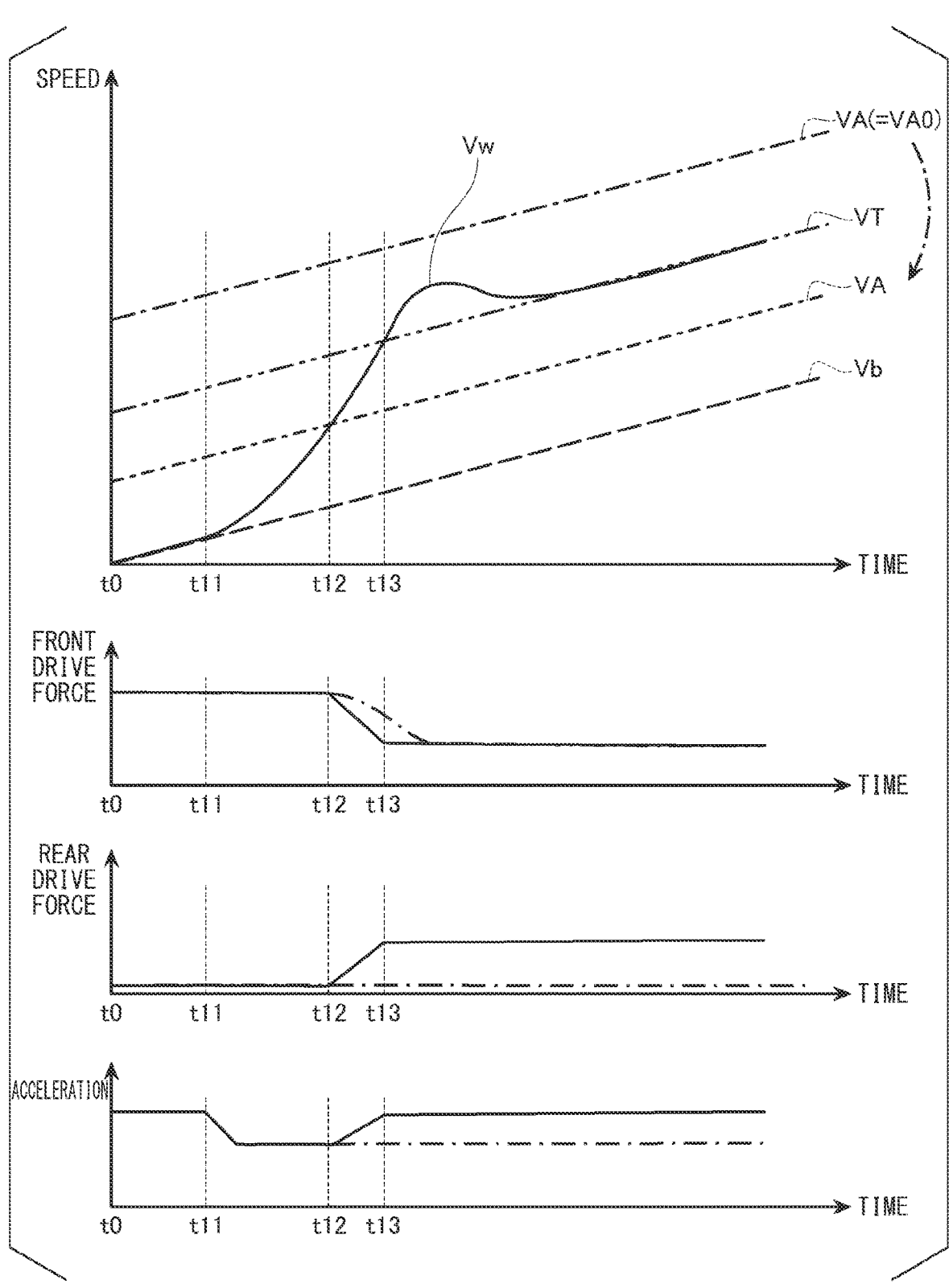
FIG. 5 is a graph showing an example of a correspondence relationship of a temporal change among a vehicle body speed, a wheel speed, a first determination threshold value, a second determination threshold value, a front drive force, a rear drive force, and acceleration at the time of vehicle acceleration in the electric vehicle control system of the embodiment of the present invention.

FIG. 4 and FIG. 5 are graphs showing an example of a correspondence relationship of a temporal change among a vehicle body speed Vb, the wheel speed Vw of the front wheel WF, which is a main drive wheel, the first determination threshold value VT, the second determination threshold value VA, a front drive force, a rear drive force, and acceleration at the time of vehicle acceleration in the electric vehicle control system 10 of the embodiment.

As shown in FIG. 4 and FIG. 5, when the wheel speed Vw of the front wheel WF, which is the main drive wheel, is increased to exceed the vehicle body speed Vb at the time of vehicle acceleration accompanied by the increase of the drive force, the front wheel WF becomes an idling state.

As shown in FIG. 4, with respect to the wheel speed Vw of the front wheel WF that changes in an increasing trend, when the first determination threshold value VT set by the traction control portion 11 is larger than the second determination threshold value VA set by the wheel torque control portion 13, the start timing of performing the traction control (TCS control) is later than the start timing of performing the torque distribution control (AWD control). For example, later than a time t1 when the wheel speed Vw becomes larger than the vehicle body speed Vb at a constant state of acceleration, first, the execution of the torque distribution control (AWD control) is started at a time t2 or later when the wheel speed Vw becomes larger than the second determination threshold value VA. By the torque distribution control (AWD control), while maintaining the overall drive force of the vehicle, the torque (front drive force) of the front wheel WF, which is the main drive wheel, is decreased, and the torque (rear drive force) of the rear wheel WR, which is the sub-drive wheel, is increased. When the idling state of the front wheel WF is resolved in this state, by effective utilization of the traction of the rear wheel WR, which is a sub-drive wheel, the overall decrease of the drive force of the vehicle is prevented. Thereby, the acceleration that is decreased at the time t1 or later in accordance with the idling of the front wheel WF is recovered at the time t2 or later by the torque distribution control (AWD control). On the other hand, when the idling state of the front wheel WF is not resolved, next, the execution of the traction control (TCS control) is started at a time t3 when the wheel speed Vw becomes larger than the first determination threshold value VT or later than the time t3. In accordance with the decrease of the torque (front drive force) of the front wheel WF, which is the main drive wheel, by the traction control (TCS control), the overall drive force of the vehicle is decreased. When the idling state of the front wheel WF is resolved by the traction control (TCS control), the acceleration is maintained at the time t3 or later.

As shown in FIG. 5, when the first determination threshold value VT set by the traction control portion 11 is smaller than the second determination threshold value VA set by the wheel torque control portion 13, the start timing of performing the traction control (TCS control) is earlier than the start timing of performing the torque distribution control (AWD control). When the traction control (TCS control) is started prior to the torque distribution control (AWD control) in this state, the overall drive force of the vehicle is decreased without effective utilization of the traction of the rear wheel WR, which is the sub-drive wheel. For example, later than a time t11 when the wheel speed Vw becomes larger than the vehicle body speed Vb at a constant state of acceleration, as indicated by a dot-and-dash line, first, the execution of the traction control (TCS control) is started at a time t13 or later when the wheel speed Vw becomes larger than the first determination threshold value VT. By the traction control (TCS control), in accordance with the torque (front drive force) of the front wheel WF, which is the main drive wheel, being decreased while maintaining the torque (rear drive force) of the rear wheel WR, which is the sub-drive wheel to be constant, the overall drive force of the vehicle is decreased. When the idling state of the front wheel WF is resolved in this state, the torque distribution control (AWD control) is not performed. Thereby, the acceleration that is decreased at the time t11 or later in accordance with the idling of the front wheel WF is maintained without being recovered by the traction control (TCS control) at the time t13 or later, as indicated by the dot-and-dash line.

Accordingly, as shown in FIG. 5, when the first determination threshold value VT is smaller than the initial second determination threshold value VA (=VA0), the initial second determination threshold value VA (=VA0) is changed to a new second determination threshold value VA that is smaller than the first determination threshold value VT in accordance with the first determination threshold value VT and the predetermined constant k (0<k<1). Thereby, as indicated by a solid line, first, the execution of the torque distribution control (AWD control) is started at a time t12 or later when the wheel speed Vw becomes larger than the new second determination threshold value VA. By the torque distribution control (AWD control), while maintaining the overall drive force of the vehicle, the torque (front drive force) of the front wheel WF, which is the main drive wheel, is decreased, and the torque (rear drive force) of the rear wheel WR, which is the sub-drive wheel is increased. The acceleration that is decreased at the time t11 or later in accordance with the idling of the front wheel WF is recovered at the time t12 or later by the torque distribution control (AWD control).

Figure 6:
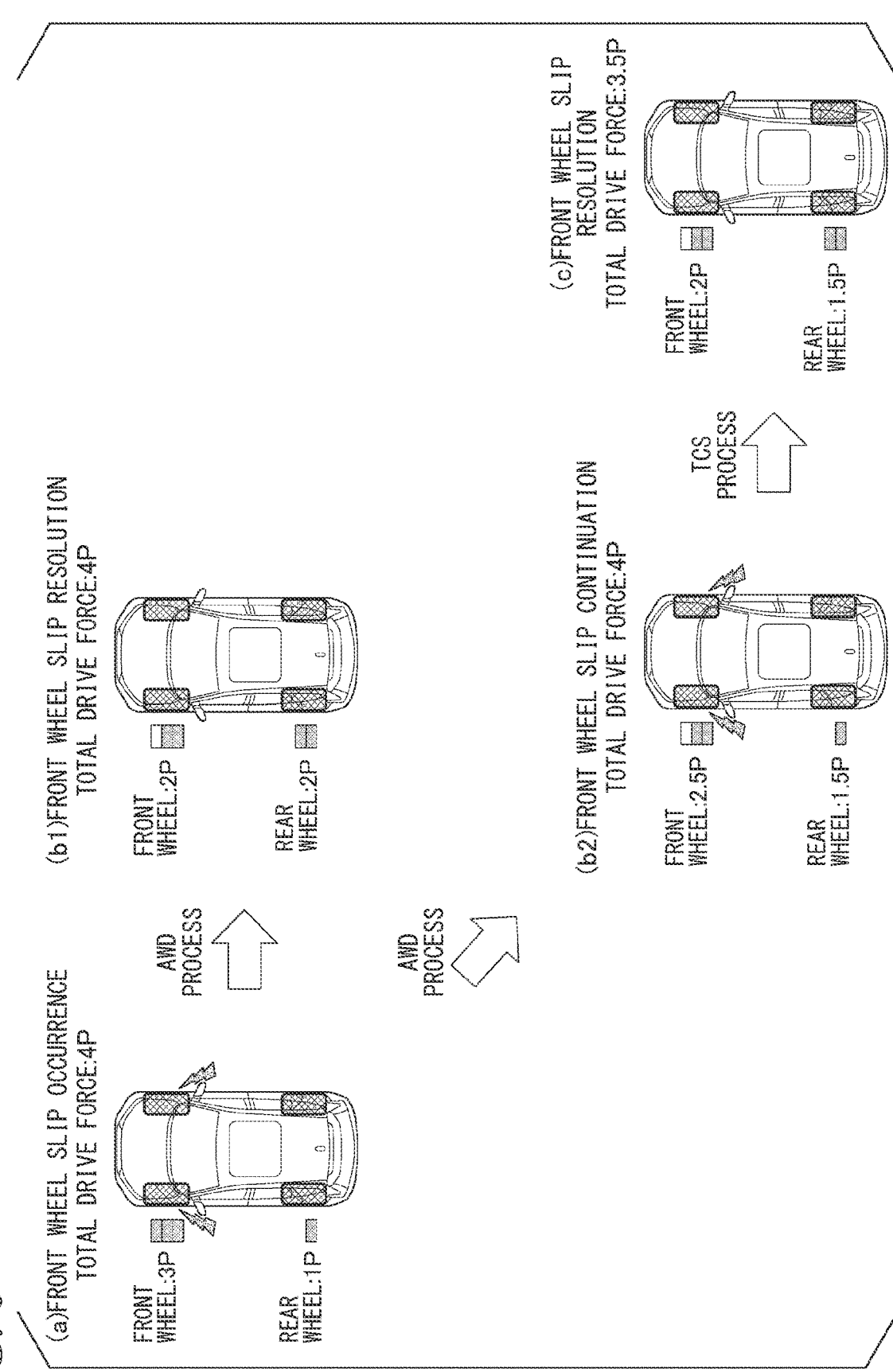
FIG. 6 is a view showing an example of a change of a drive force of a front wheel and a rear wheel in response to an AWD (All-Wheel Drive) process and a TCS (Traction Control System) process at the time of vehicle acceleration in the electric vehicle control system of the embodiment of the present invention.

FIG. 6 is a view showing an example of a change of a drive force of the front wheel WF and the rear wheel WR in response to an AWD process and a TCS process at the time of vehicle acceleration in the electric vehicle control system 10 of the embodiment.

A state (a) shown in FIG. 6 is a state in which, for example, idling occurs in the front wheel WF of the main drive wheel at the time of vehicle acceleration, and the overall drive force (total drive force) of the vehicle is an appropriate total drive force (=4 P) in accordance with a predetermined value P. The total drive force (=4 P) in the state (a) is distributed, for example, to an appropriate drive force (=3 P) of the front wheel WF and an appropriate drive force (=1 P) of the rear wheel WR. In the state (a) in which idling occurs in the front wheel WF of the main drive wheel, as described above, first, the torque distribution control (AWD control) is performed by the AWD process.

A state (b1) is a state in which, by the torque distribution control (AWD control), part (=1 P) of the drive force of the front wheel WF is moved to the drive force of the rear wheel WR, and thereby, the idling of the front wheel WF is resolved. The total drive force (=4 P) in the state (b1) is not changed from the state (a) and is distributed, for example, to the drive force (=2 P) of the front wheel WF and the drive force (=2 P) of the rear wheel WR.

On the other hand, a state (b2) is a state in which, by the torque distribution control (AWD control), part (=0.5 P) of the drive force of the front wheel WF is moved to the drive force of the rear wheel WR, and thereby, the idling of the front wheel WF is not resolved. The total drive force (=4 P) in the state (b2) is not changed from the state (a) and is distributed, for example, to the drive force (=2.5 P) of the front wheel WF and the drive force (=1.5 P) of the rear wheel WR. In the state (b2) in which the idling of the front wheel WF continues after the torque distribution control (AWD control) is performed, as described above, next, the traction control (TCS control) is performed by the TCS process.

The state (c) is a state in which the idling of the front wheel WF is resolved by the total drive force being decreased in accordance with the decrease of the drive force of the front wheel WF by the traction control (TCS control). The total drive force (=3.5 P) in the state (c) is decreased from the total drive force (=4 P) of the state (a) and the state (b2) and is distributed, for example, to the drive force (=2 P) of the front wheel WF and the drive force (=1.5 P) of the rear wheel WR.

As described above, according to the electric vehicle control system 10 of the embodiment, by prioritizing the operation of the wheel torque control portion 13 over the operation of the traction control portion 11, for example, it is possible to prevent the operation of the traction control portion 11 that may decrease the torque in order to ensure a desired traction. By prioritizing the wheel torque control portion 13 that can control the torque of each wheel W without decreasing the overall torque of the vehicle, it is possible to appropriately resolve a slip state while preventing a decrease of acceleration or deceleration and preventing the vehicle behavior from becoming unstable.

By providing the motor control portions 15 and 17 individually on each rotary electric machine M, it is possible to shorten the time required for the control of each rotary electric machine M.

By changing the second determination threshold value VA in accordance with the first determination threshold value VT, it is possible to prioritize the operation of the wheel torque control portion 13 without changing the operation of the traction control portion 11.

Since the wheel torque control portion 13 can be prioritized over the traction control portion 11 by only changing the operation of the wheel torque control portion 13, it is possible to reduce the time and effort required for changing the existing system and make the process less complicated.

By changing the torque distribution of each wheel W without decreasing the overall torque of the vehicle, the wheel torque control portion 13 can resolve a slip state.

Modification Example

Hereinafter, a modification example of the embodiment is described. The same portions as those of the embodiment described above are denoted by the same reference numerals, and descriptions thereof are omitted or simplified.

The above embodiment is described using an example in which the wheel torque control portion 13 changes the second determination threshold value VA in accordance with the first determination threshold value VT when the wheel torque control portion 13 determines that the start timing of performing the traction control is earlier than the start timing of performing the torque distribution control; however, the embodiment is not limited thereto. For example, in response to the second determination threshold value VA being changed in accordance with the first determination threshold value VT, the gain of the feedback control of the motor control portions 15 and 17 may be changed. By changing the gain of the feedback control, it is possible to improve control accuracy.

The above embodiment is described using an example of the operation at the time of vehicle acceleration shown in FIGS. 2, 3, 4, 5, and 6; however, the embodiment is not limited thereto. For example, the operation of the wheel torque control portion 13 may be prioritized over the operation of the traction control portion 11 at the time of vehicle deceleration and at the time of regeneration operation of the rotary electric machine M.

The above embodiment is described using an example in which an idling state is different between the front wheel WF and the rear wheel WR of the vehicle; however, the embodiment is not limited thereto. For example, with respect to the case where the idling state is different between a right wheel and a left wheel of the vehicle, the operation of the wheel torque control portion 13 may be prioritized over the operation of the traction control portion 11.

The above embodiment is described using an example in which the vehicle includes the front motor MF connected to the right and left front wheels WF and the rear motor MR connected to the right and left rear wheels WR; however, the embodiment is not limited thereto.

For example, a rotary electric machine M may be individually provided on each wheel W, or a rotary electric machine M may be individually provided on each of appropriate combinations of the plurality of wheels W.

The embodiments of the present invention have been presented as examples and are not intended to limit the scope of the invention. These embodiments can be implemented in a variety of other modes, and various omissions, substitutions, and modifications can be made without departing from the scope of the invention. These embodiments and modifications thereof are included in the scope and gist of the invention and are also included in the scope of the invention described in the appended claims and equivalent thereof.

What is claimed is:

1. An electric vehicle control system, comprising:
a first control portion that controls a traction of respective ones of a plurality of wheels;
a second control portion that controls a torque of the respective ones of the plurality of wheels by setting a requested torque for respective ones of a plurality of rotary electric machines that at least one of transmit the torque to or receive the torque from, the plurality of wheels;
a plurality of rotary electric machine control portions that control an operation of the respective ones of the plurality of rotary electric machines in response to a command input from the first control portion and the second control portion; and
a cooperation control portion that relatively prioritizes an operation of the second control portion over an operation of the first control portion in accordance with an idling state of at least one of the plurality of wheels, wherein the cooperation control portion comprises the second control portion, and wherein the second control portion performs the operation of the second control portion prior to the operation of the first control portion in response to the idling state.

2. The electric vehicle control system according to claim 1, wherein the plurality of rotary electric machine control portions are provided individually so as to correspond to the respective ones of the plurality of rotary electric machines.

3. The electric vehicle control system according to claim 1, wherein the cooperation control portion relatively prioritizes the operation of the second control portion over the operation of the first control portion, by changing a second determination threshold value that determines whether or not it is necessary to operate the second control portion with respect to the idling state, in accordance with a first determination threshold value that determines whether or not it is necessary to operate the first control portion with respect to the idling state.

4. The electric vehicle control system according to claim 3, wherein the first control portion controls the traction of the respective ones of the plurality of wheels by setting a target rotation speed for the respective ones of the plurality of rotary electric machines, and wherein the second control portion sets a torque distributed to the respective ones of the plurality of wheels in accordance with the requested torque, requested from a driver.

5. The electric vehicle control system according to claim 2, wherein the cooperation control portion relatively prioritizes the operation of the second control portion over the operation of the first control portion, by changing a second determination threshold value that determines whether or not it is necessary to operate the second control portion with respect to the idling state, in accordance with a first determination threshold value that determines whether or not it is necessary to operate the first control portion with respect to the idling state.

6. The electric vehicle control system according to claim 5, wherein the first control portion controls the traction of the respective ones of the plurality of wheels by setting a target rotation speed for the respective ones of the plurality of rotary electric machines, and wherein the second control portion sets the requested torque distributed to the respective ones of the plurality of wheels in accordance with a torque requested from a driver.

7. The electric vehicle control system according to claim 1, wherein the operation of the first control portion is an operation of decreasing an overall torque of a vehicle, and wherein the operation of the second control portion is an operation of changing the torque of the respective ones of the plurality of wheels without decreasing the overall torque of the vehicle.

* * * * *